United States Patent [19]

Basile

[11] Patent Number: 5,611,045
[45] Date of Patent: Mar. 11, 1997

[54] DETECTING THE PRESENCE OF A DEVICE ON A COMPUTER SYSTEM BUS BY MEASURING THE RESPONSE TIME OF DATA SIGNALS ON THE BUS, AND MAXIMIZING SYSTEM PERFORMANCE BASED ON THAT RESPONSE TIME

[75] Inventor: Barry S. Basile, Houston, Tex.

[73] Assignee: Compaq Computer Corporation, Houston, Tex.

[21] Appl. No.: 145,339

[22] Filed: Oct. 29, 1993

[51] Int. Cl.$^6$ .................................................... G06F 11/34
[52] U.S. Cl. ................................ 395/184.01; 395/185.04; 371/61
[58] Field of Search .................................... 395/575, 550, 395/184.01, 185.01, 185.04, 185.09; 371/29.5, 15.1, 22.3, 61, 57.1

[56] References Cited

U.S. PATENT DOCUMENTS

| | | | |
|---|---|---|---|
| 4,843,572 | 6/1989 | Linkowski et al. | 364/519 |
| 4,926,310 | 5/1990 | Inuzuka et al. | 364/186 |
| 4,999,805 | 3/1991 | Culley et al. | 364/900 |
| 5,257,387 | 10/1993 | Richek et al. | 395/800 |
| 5,263,148 | 11/1993 | Jones, Jr. et al. | 395/500 |
| 5,327,564 | 7/1994 | Little | 395/725 |
| 5,353,432 | 10/1994 | Richek et al. | 395/500 |

*Primary Examiner*—Robert W. Beausoliel, Jr.
*Assistant Examiner*—Phung My Chung
*Attorney, Agent, or Firm*—Pravel, Hewitt, Kimball & Krieger

[57] ABSTRACT

A computer system determines the presence of a device attached to a system bus that responds to I/O or memory reads by driving the data lines of that bus to values normally present on an undriven bus. The data bus is first driven to a value other than its undriven value, such as to 00h. Then, circuitry measures the time it takes on an I/O or memory read for the data bus to return to its normally undriven value. If the response time is less than the time it takes for an undriven data bus to return to its undriven state, then an expansion board is driving the data bus to its normally undriven value. This indicates that the expansion board is responding to an I/O or memory read on the data bus, even though it is responding by driving that bus to its normally undriven value. Further, by determining the maximum response time of a device, system performance is then improved by tuning cycle time to correspond to that maximum response time.

15 Claims, 8 Drawing Sheets

DETECTING THE PRESENCE OF A DEVICE ON A COMPUTER SYSTEM BUS BY MEASURING THE RESPONSE TIME OF DATA SIGNALS ON THE BUS, AND MAXIMIZING SYSTEM PERFORMANCE BASED ON THAT RESPONSE TIME

SPECIFICATION

RELATED CASES

This application is related to co-pending Ser. No. 08/145,400, filed Oct. 29,1993, entitled "Method of and Apparatus for Disabling Individual Slots on a Computer Bus" and to co-pending Ser. No. 08/145,338, filed Oct. 29, 1993, entitled "Method of Determining the Configuration of Devices Installed on a Computer Bus," all of which have been assigned to the assignee of this application.

BACKGROUND OF THE INVENTION

1. Field of the Invention

The invention relates to computer busing systems, and more particularly to a method of and apparatus for detecting whether a device responds to a particular I/O or memory address asserted on that bus.

2. Description of the Related Art

The microcomputer industry has experienced tremendous growth over the last twenty years. From the days of its infancy when only a few interested "hackers" could fathom its quirks and nuances, the microcomputer has now evolved into a powerful business and personal tool found on virtually every office desk and in virtually every home.

The microcomputer's road to success has not been without its problems, however. While advances occur at an astounding pace, those advances must accommodate the standards found in the then existing base of microcomputer systems. This is known as upwards compatibility. To maintain such compatibility, the industry has seen one microcomputer standard laid on top of another, with a resulting hodgepodge of standards-within-standards that designers must maintain to allow existing users to upgrade their equipment. These multiple standards gradually shed their oldest layers, replacing them with new layers reflecting the state-of-the-art. In this way, only the very oldest microcomputer systems become obsolete.

One early idea to enhance microcomputer systems was the addition of hardware enhancing cards. These cards were generally plugged into a system bus to provide added functionality, such as telecommunications, disk storage, and improved video. These cards obviously had to conform to some standard. With the introduction of the IBM PC by International Business Machines Corp., and the later introduction of the PC/AT by IBM, the AT system bus soon became a de facto standard known as the Industry Standard Architecture bus, or the ISA bus. The AT bus accommodated both the 8-bit cards of the PC and newer 16-bit cards developed for the AT. Third-party manufacturers could economically design standard cards compatible with the wide variety of IBM PC and AT compatible microcomputer systems.

Further advances in microprocessor technology, however, pushed the ISA bus to its limits. For this reason, another "layer" was added to the ISA bus standard. This added layer became known as the Extended Industry Standard Architecture bus, or the EISA bus. Cards designed for the EISA bus had more pins, providing a wider data path for information to flow through the microcomputer system bus, analogous to adding lanes to a highway. The EISA bus also added more address lines to the standard, permitting more memory locations to be individually specified, much as would adding more digits to a phone number or a zip code.

One limitation of the ISA bus involved its method of handling I/O addressing. An address enable signal (AEN) was driven low by an ISA bus master to indicate to all of the cards that the currently asserted address was an I/O address or a memory address rather than a direct memory access (DMA) operation. But because AEN was asserted low to all cards, each card had to be physically configured to respond to a different range of I/O or memory addresses to avoid conflicts. This address differentiation was usually accomplished when installing the boards by setting microswitches on dual in-line packages (DIP) or by connecting jumpers on each board. Improperly setting these switches could result in conflicts on a read or write to a particular I/O or memory address and could even result in physical hardware damage.

While the ISA standard provided 16 bits of I/O addressing, in developing cards for PC-compatible computers, vendors often only used or decoded the lower 10 bits. Thus, to be fully compatible with the available cards, the I/O address space of the ISA bus effectively was only from 0 to 03FFh. Thus, a large portion of the I/O space was unusable.

The EISA bus standard has resolved this problem to some extent. The EISA bus definition provides for a conflict-free I/O address space for each slot. This is fully described in U.S. Pat. No. 4,999,805 and the EISA Specification, Version 3.1, which is Appendix 1 of U.S. Pat. No. 4,101,492, both of which are hereby incorporated by reference. The expansion board manufacturers include a configuration file with each EISA expansion board, and optionally, with switch programmable ISA products. A configuration utility program provided by the system manufacturer uses the information contained in the configuration files to determine a conflict-free configuration of the system resources. The configuration utility stores the configuration and initialization information into non-volatile memory and saves a backup copy on diskette. Details of this configuration process are provided in Ser. No. 07/293,315, entitled "Method and Apparatus for Configuration of Computer System and Circuit Boards," allowed on May 10, 1993, which is hereby incorporated by reference. The system ROM power up routines use the initialization information to initialize the system during power up, and device drivers use the configuration information to configure the expansion boards during operation.

However, this slot specific addressing does not help with ISA cards. Slot specific ISA card disabling can prevent such physical conflicts between two cards during their initialization. Briefly, a mask register is provided to mask off the AEN signal to selected slots. Details are provided in Ser. No. 08/145,400, entitled "Method of and Apparatus for Disabling Individual Slots on a Computer Bus," filed concurrently herewith, which is hereby incorporated by reference. The startup routines individually enable each ISA slot using a slot specific mask register. The startup routines then must determine what address spaces that card occupies. With the address space identified, this results in a signature and allows a determination of the particular card, to allow conflict checking and user setup. This is described in Ser. No. 08/145,338, entitled "Method of Determining the Configuration of Devices Installed on a Computer Bus," filed concurrently herewith, which is hereby incorporated by reference.

Further, the slot specific addressing is of no assistance with memory operations, as the EISA bus standard does not provide for slot specific memory spaces for ISA cards.

Once the startup routines enable a single ISA card, however, determining what addresses that card responds to is not trivial. Unlike EISA cards, ISA boards do not provide an identification register. Thus, the occupied address space of an ISA board must be determined in some other way.

In a typical system, a number of ISA boards may be installed, and the system software must then determine not only whether an ISA board is present in a particular slot, but also what type of board is installed in that slot. This involves determining what I/O read addresses a particular board occupies. First, using the slot specific disabling described in Ser. No. 08/145,400, a single slot on the ISA or EISA system bus is enabled. Then, all of the I/O and memory addresses are read. Each address that returns a value different from what an undriven data bus would return indicates that the enabled board has driven the data bus in response to a read from that particular I/O or memory address. To simplify this determination, the data bus is pulled up by resistors so that a read from a particular address returns 0FFh if the bus is not driven.

But just because a read results in 0FFh does not necessarily mean the bus is undriven. The particular board installed in the enabled slot may actually be driving an 0FFh on the data lines at that address in response to the read. Using standard systems, there is no way to determine this difference. Thus, a read value of 0FFh remains ambiguous and only non-0FFh locations are positively known. This will often leave a very large number of ambiguous locations, rendering identification of the board more difficult.

It would be desirable to determine each I/O or memory read address at which a particular board or device responds by driving the data bus, whether driving with the undriven value of the data bus or otherwise.

SUMMARY OF THE INVENTION

It is simple to detect when an ISA board drives values onto the data bus different from the undriven state—the I/O or memory read returns a value other than the undriven data bus value 0FFh on a pulled-up data bus, and 00h on a pulled-down data bus. The apparatus and method according to the invention, however, go further. If a particular I/O or memory read returns a data bus value of 0FFh, or whatever the undriven data bus value is, the apparatus and method according to the invention then perform a special read cycle to determine whether the I/O or memory device is actually driving the data bus to its normally undriven value. At the start of this special read cycle, signals are appropriately set to prevent a bus controller from completing the read request in the normal time. Then, the data bus is driven to a value other than its normally undriven value, preferably to an 00h value for a pulled-up data bus, or 0FFh for a pulled-down data bus.

The system then places an I/O or memory read signal onto the control lines of the bus, allowing the device under test to respond by driving the data bus, if addressed. At the same time, the system starts a timer. When the value on the data bus changes from the value previously driven onto the data bus to the undriven value, the timer is stopped and the read cycle is completed.

This timer value is compared to the time it takes an undriven bus to change from a previously driven value to its undriven value through its pull-up or pull-down resistors. If this timer value is shorter than the normal bus response time (the time for the pull-up or pull-down resistors to pull to the undriven logic level based on the bus capacitance and the resistor value) this indicates that something more than either the pull-up or pull-down resisters is driving the data bus; that something more is the device under test. So even if the device under test drives the data bus to its undriven value, the method and apparatus of the invention determines the device's response by noting that it drives the data bus to its normally undriven value faster than the data bus would respond on its own. Therefore, it is known that the device under test has responded to the I/O or memory read at the particular address.

The method and apparatus according to the invention is preferably accomplished using a pulled-up data bus, driving all zeros onto an EISA or ISA bus, and then measuring the amount of time it takes for those zeros to change to ones. This technique is not limited to EISA or ISA systems, but can be used in any situation in which a device may respond to a particular command by another device on a bus.

Further according to the invention, the maximum response time of all of the data lines is determined for a response from a particular expansion board. Using the maximum response time, the system then "performance tunes" operations using that expansion board by shortening the cycle length for operations involving that expansion board.

BRIEF DESCRIPTION OF THE DRAWINGS

A better understanding of the invention can be obtained when the following detailed description of the preferred embodiment is considered in conjunction with the following drawings, in which.

DETAILED DESCRIPTION OF THE PREFERRED EMBODIMENT

Figure 1:
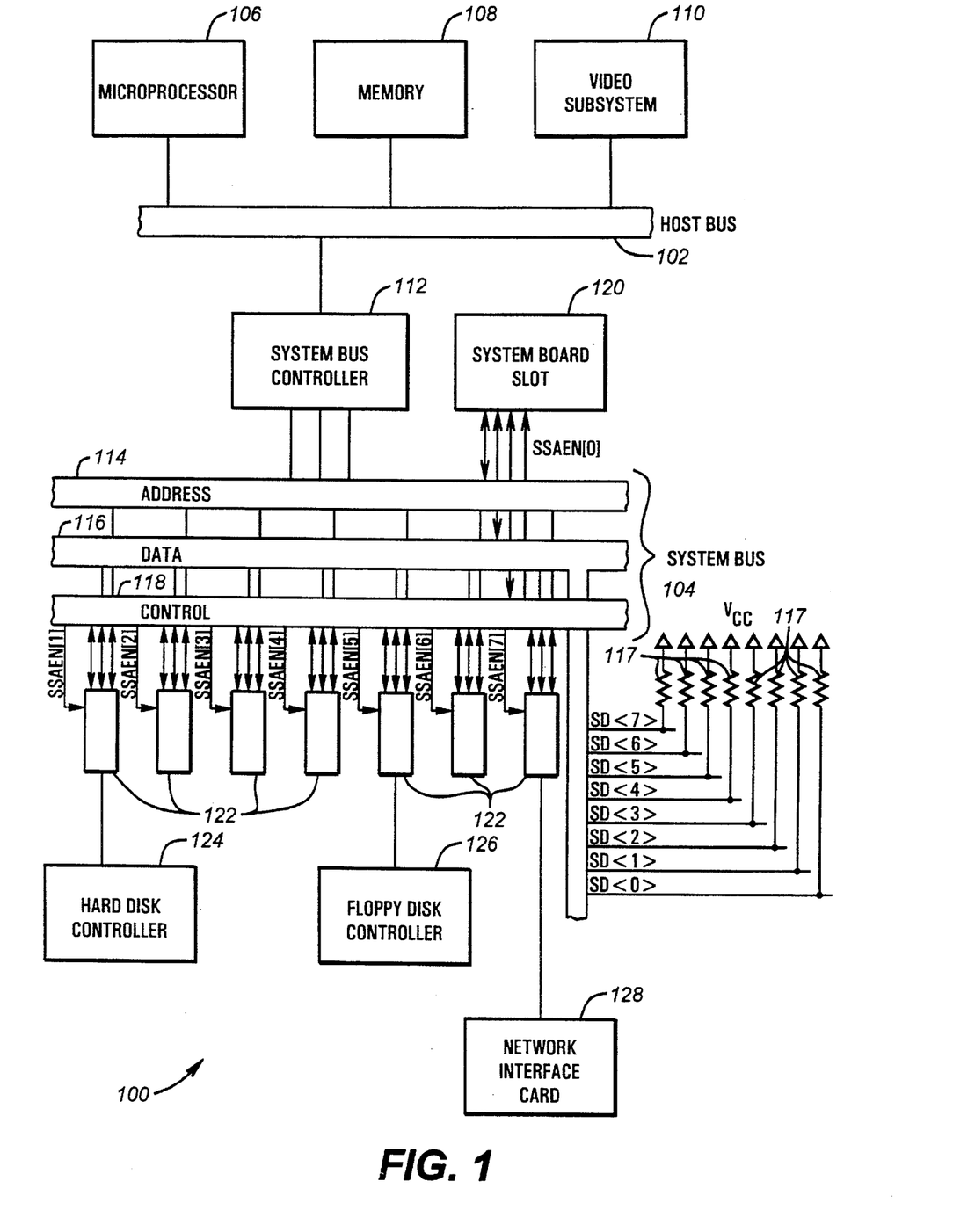
FIG. 1 is a block diagram of a computer system incorporating the method and apparatus according to the invention.
Figures 2A, 2B, 2C, 2D, 2E, 2F:
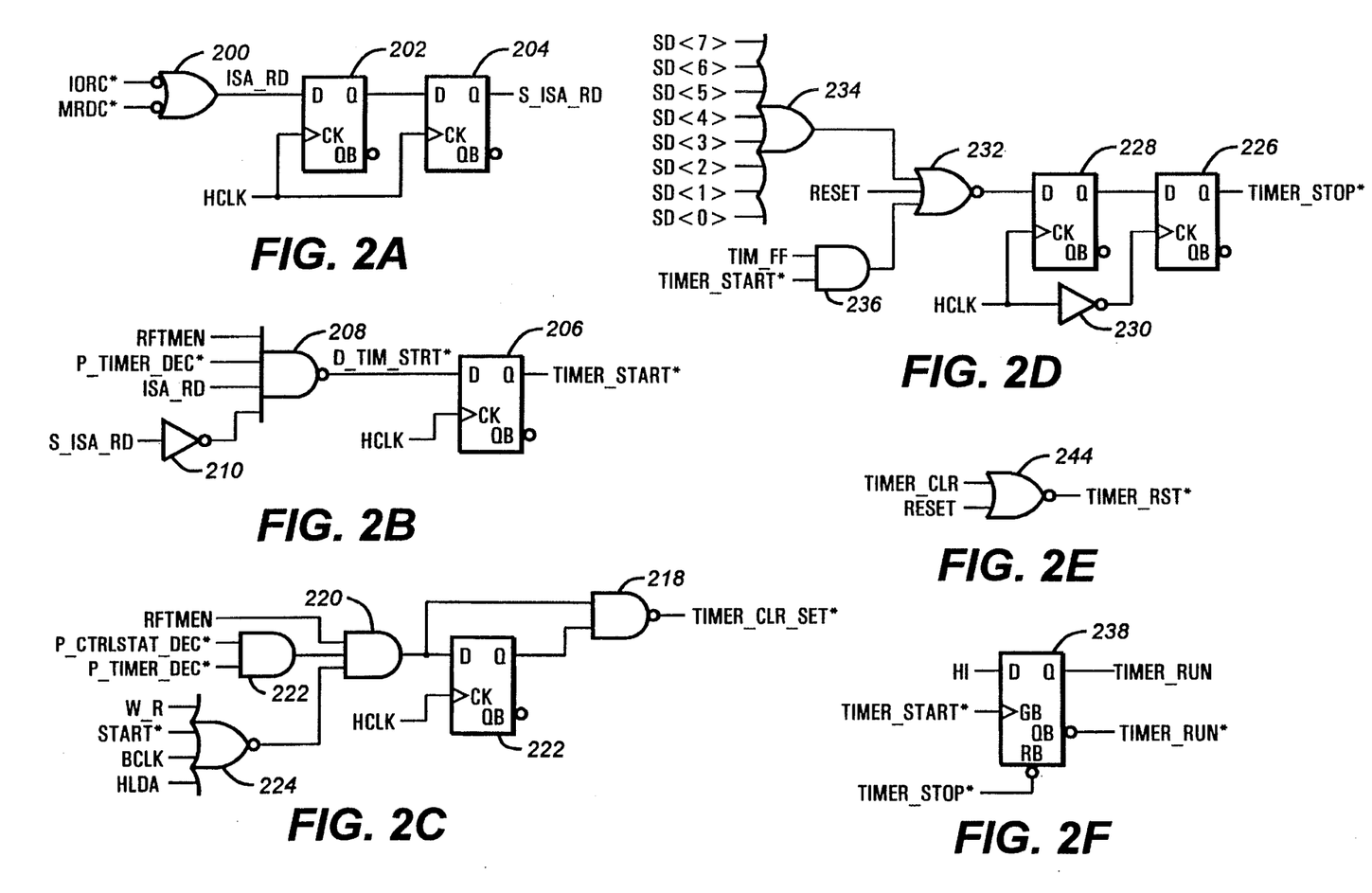
FIGS. 2A–2I and 3A–3C are schematic illustrations of circuitry used to implement data bus rise time measurement according to the invention.
Figure 2G:
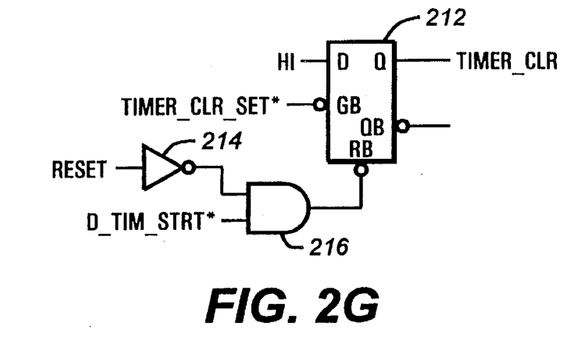
Figure 2H:
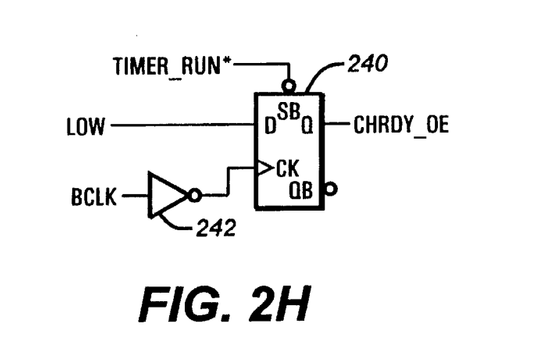
Figure 2I:
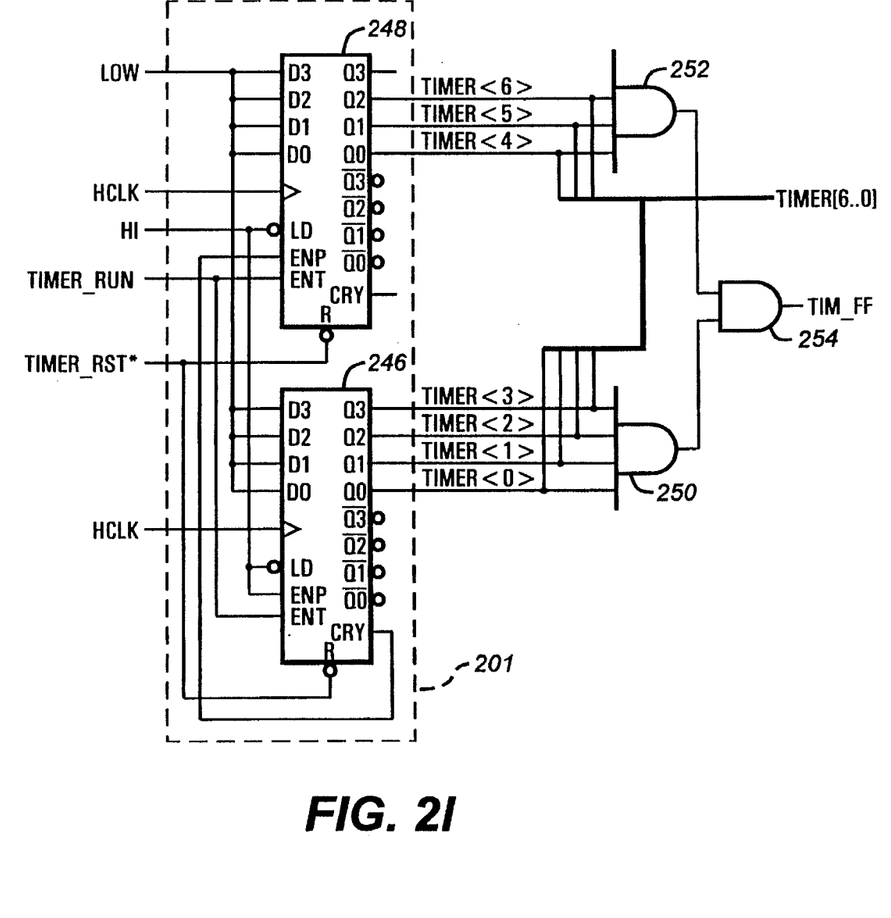

Turning now to the drawings, FIG. 1 is a block diagram of a microcomputer system 100 in which the method and apparatus according to the invention is implemented. The microcomputer system 100 includes a host bus 102 and a system bus 104. A microprocessor 106, memory 108, and a video subsystem 110 internally communicate at high speed with each other over the host bus 102. The host bus 102 is designed for speed rather than expansion, so the host bus 102 has little, if any, provision for expansion boards.

A system bus controller 112 provides an interface between the host bus 102 and system bus 104. The system bus controller 112 is located on the system board of the microcomputer system 100. The system bus controller 112 is preferably implemented using an application specific integrated circuit (ASIC) but could be implemented using discrete components.

The system bus 104 is typically an EISA bus, but could be another bus using similar addressing protocols. The system bus controller 112 implements the functions of an EISA bus controller. It is also within the system bus controller 112 that the data bus response time circuitry according to the invention is preferably implemented.

The system bus 104 consists of address lines 114, data lines 116, and control lines 118. Connected to the system bus 104 is a system board slot 120. The system board slot 120 is not a separate physical connection, but instead logically connects "devices" integrated into the system board of the microcomputer system 100 itself to the system bus 104. Further connected to the system bus 104 are slots 122. The slots 122 are physical connectors for inserting expansion cards compatible with the standard of the system bus 104 to provide the added functionality to the microcomputer system 100. Shown inserted in the first, fifth, and seventh of the slots 122 are respectively a hard disk controller 124, a floppy disk controller 126, and a network interface card 128.

The lower byte of the data lines 116, denoted as SD[7 . . 0], are pulled up by pull-up resistors 117. These pull-up resistors 117 ensure that the undriven data lines 116 return a value of 0FFh. The EISA standard specifies that these pull-up resistors 117 should be 8.2 k ohm.

As is further discussed below, the pull-up resistors 117 can instead be pull-down resistors. In such a case, the value returned by an I/O read of an undriven data bus is then 00h instead of 0FFh.

Each device connected to the system bus 104, whether a device plugged into one of the slots 122 or a system board device corresponding to the system board slot 120, includes an individual slot specific address enable line SSAEN[Z], where Z equals 0 to 7. These signals correspond to the AENx signals of the EISA specification or AEN signal for ISA systems, but further implementing slot specific disabling, as is described in Ser. No. 08/145,400, as referenced above.

FIGS. 2A–2I and 3A–3C are schematics of circuitry used to implement the bus response time feature according to the invention. Although these schematics show generic discrete parts, they are preferably implemented as part of the system bus controller 112 in an application specific integrated circuit. Further, the system bus 104 is preferably an EISA bus and the microprocessor 106 is preferably an 80×86 series microprocessor by Intel Corporation.

In the discussion that follows, signals are delineated in all upper case, with active low signals followed by an asterisk. When such an active low signal is described as "asserted," it is low. Similarly, when such a signal is described as "deasserted," it is high. The logical negation of signals is also shown by following the signal with an asterisk. The actual physical levels, that is, whether a signal is active high or active low, is specified where appropriate.

Turning to FIG. 2A–2I, an ISA read signal ISA_RD is output by a NAND gate 200. The inputs to the NAND gate 200 are the I/O read control strobe IORC* and the memory read control strobe MRDC*, both found among the control lines 118 on the ISA portion of an EISA bus. ISA_RD goes high when the EISA bus begins an ISA memory or I/O read cycle. ISA_RD is filtered through two D flip-flops 202 and 204 clocked by the host bus clock signal HCLK, forming a synchronized and delayed ISA read signal S_ISA_RD. HCLK is some multiple of the frequency of the EISA bus clock signal BCLK, depending on the processor frequency and type. HCLK is used to synchronize signals at times other than the rising and falling edges of BCLK.

ISA_RD and S_ISA_RD are used to generate a timer start signal TIMER_START*. TIMER_START* is generated by synchronizing a signal D_TIM_STRT* through a flip-flop 206. Again, the flip-flop 206 is clocked using HCLK. D_TIM_STRT* is provided by a NAND gate 208, which as inputs uses a rise-fall timer enable signal RFTMEN, a signal P_TIMER_DEC* designating whether an I/O port read has been decoded to an I/O address returning the rise-fall timer counter value, ISA_RD, and S_ISA_RD*. RFTMEN is set by writing an arbitrary bit to a register at an I/O address P_CTRLSTAT, the register providing control capabilities and status information. If RFTMEN is set low, the timing feature is disabled. Similarly, the particular cycle is not timed if the access is to the timer itself.

TIMER_START, equals D_TIM_STRT* synchronized to HCLK. TIMER_START, indicates to circuitry to be discussed later that a timer 201 for determining the rise time is to begin running. Because ISA_RD and S_ISA_RD* are NAND'd together by the NAND gate 208, TIMER_START, is an active low pulse two HCLK's long.

On its falling edge, TIMER_START* starts the timer 201, which counts HCLK cycles to determine how long it takes for the data lines 116 to rise to a value other than 00H. Before TIMER_START* is asserted low, however, the data lines 116 must be precharged to 00H. A signal TIMER_CLR causes the data lines 116 to be driven low. The Q output of a latch 212 provides TIMER_CLR. The D input to the latch 212 is tied to logical high, and that high signal is gated to the Q output when a timer clear set signal TIMER_CLR_SET* goes low, enabling the gate input to the latch 212. This signal is discussed below. The reset input to the latch 22 is driven by an AND gate 216, which has as inputs D_TIM_STRT* and a signal RESET*, which is the negation of a system reset signal RESET.

TIMER_CLR_SET* is provided by the output of a NAND gate 218. The inputs to the NAND gate 218 are the output of a three input AND gate 220 and the Q output of a flip-flop 222. The flip-flop 222 is clocked by the HCLK signal, and at its D input receives the output of the AND gate 220.

The AND gate 220 includes three inputs: RFTMEN indicates that the rise time circuitry is enabled, the output of an AND gate 222, which as inputs receives P_TIMER_DEC* and a signal P_CTRLSTAT_DEC*, and the output of a NOR gate 224. P_CTRLSTAT_DEC* indicates an I/O operation to the I/O P_CTRLSTAT register previously discussed. When either P_CTRLSTAT_DEC* or P_TIMER_DEC* is asserted low, TIMER_CLR_SET, remains unasserted, preventing activation of the rise time circuitry for operations to the rise time circuitry. In this manner, the rise time circuitry does not lose the data from the previous cycle by overwriting it with rise time values for the current cycle. The third input to the AND gate 220 is the output of a NOR gate 224, which receives as inputs the EISA signals W_R, START*, and BCLK, and a host bus hold acknowledge signal HLDA. The output of the NOR gate 224 goes high on EISA reads that are not refresh cycles when HLDA is not asserted, both BCLK is low, and START* is asserted active low.

TIMER_CLR_SET* goes low shortly after the first negative edge of BCLK after START* is asserted active low. This ensures that another device is not driving the data lines 116 when the rise time circuitry drives the data lines 116 to zero, as described below.

A signal TIMER_STOP* to stop the timer 201 is provided as the Q output of a flip-flop 226. The D input of the flip-flop 226 receives the Q output of a flip-flop 228. The flip-flop 228 is clocked by HCLK while the flip-flop 226 is clocked by HCLK*, provided by an inverter 230.

The D input to the flip-flop 228 is driven by a NOR gate 232. The inputs to this NOR gate 232 are RESET, the output of an OR gate 234, and the output of an AND gate 236. The OR gate 234 has as inputs the first eight lines SD[7 . . 0] of the data lines 116. The AND gate 236 has as inputs TIMER_START* and a timeout signal TIM_FF and TIMER_START*. TIM_FF is discussed below.

TIMER_STOP* thus goes low either when there is a reset, when one of the data lines 116 has risen to the logic level one threshold, or when TIMER_START* is negated and TIM_FF is also high, indicating a timeout.

Because the OR gate 234 detects levels of relatively slowly rising signals, its inputs are preferable Schottky type, or some other type of logic that exhibits a similar sharp and reproducible input voltage versus output voltage curve.

TIMER_START* and TIMER_STOP* are combined in a latch 238 to form a TIMER_RUN signal. TIMER_START* is provided to the gate input, and the D input is connected to logic high. When TIMER_START* is asserted, the Q output of the latch 238 to output TIMER_RUN goes true. When TIMER_STOP*, which is connected to the inverted reset input of the latch 238, is asserted low, TIMER_RUN is set low. Thus, TIMER_RUN is only high between the assertions of TIMER_START* and TIMER_STOP*. The latch 238 also provides at its Q* output a negated TIMER_RUN signal, TIMER_RUN*.

TIMER_RUN causes the ISA signal CHRDY to be pulled low. This is done using a latch 240, which is clocked by BCLK* provided by an inverter 242. The D input to the latch 240 is logic low, and the TIMER_RUN* signal is connected to the set input of the latch 240. Therefore, a signal CHRDY_OE provided as the Q output of the latch 240 is low whenever BCLK goes low as long as TIMER_RUN* is not asserted. When TIMER_RUN* is asserted, however, the signal CHRDY_OE is high, causing the signal CHRDY to be pulled low by a tristate buffer, not shown.

CHRDY is pulled low while the logic is waiting for an external device to drive the data bus to something other than zero. Pulling CHRDY low prevents the system bus controller 112 from continuing the current I/O read cycle according to its default timing, which would interfere with the operation of the rise time circuitry. CHRDY stays low until one of the bits of the data bus changes or the timer times out, to be discussed later. The system bus controller 112 can then finish the read cycle.

A timer reset signal TIMER_RST* is provided by a NOR gate 244, which has TIMER_CLR and RESET as inputs.

The timer 201 itself is a pair of cascaded 4-bit counters 246 and 248. Although preferably implemented in an ASIC providing all of the functions of the system bus controller 112, these counters 246 and 248 are similar to a 74LS163 synchronized 4-bit counter. The load inputs are pulled high, preventing the counters 246 and 248 from loading from their data inputs, which are pulled low. The counter 246 provides a carry output to the ENP input of the counter 248. The ENP input of the counter 246 is tied to logic high. To enable the counters 246 and 248, TIMER_RUN drives the ENT inputs of both the counters 246 and 248. When this signal is high, the counters 246 and 248 count. The counters 246 and 248 are reset by TIMER_RST*.

The counters 246 and 248 are clocked with HCLK, and they thus count the number of HCLK pulses. HCLK preferably runs at 33 MHz, so the counters 246 and 248 have a resolution of 30 nsec. The actual rise time for an undriven bus can vary, but would typically be around 400 nsec, or a counter value of around 12.

The outputs of the counters 246 and 248 provide the signals TIMER[6 . . 0]. These signals are AND'd together by AND gates 250, 252, 254. TIMER[3 . . 0] drive the inputs of the quad-input AND gate 250 and TIMER[6 . . 4] drive the inputs of the three-input AND gate 252. The outputs of the quad-input AND gate 250 and the three-input AND gate 252 then drive the AND gate 254, which provides TIM_FF.

TIM_FF only goes high when all of the signals TIMER[6 . . 0] are high. This corresponds to a decimal count of 128, and indicates 128 HCLKs have been counted without the timer being reset by TIMER_RST*. TIM_FF causes TIMER_STOP* to go low, but not until an extra HCLK has passed. Thus, when TIM_FF causes the counters 246 and 248 to time out, they first "roll over" to an output of 00 before stopping, causing TIMER[6 . . 0] to equal zero. TIMER[6 . . 0] are also provided as inputs to a multiplexer 316 discussed below. Through the multiplexer 316, the microprocessor 106 can read the value present in the timer 201 through an I/O read of a port P_TIMER, with a zero value indicating a timeout.

Figure 3A:
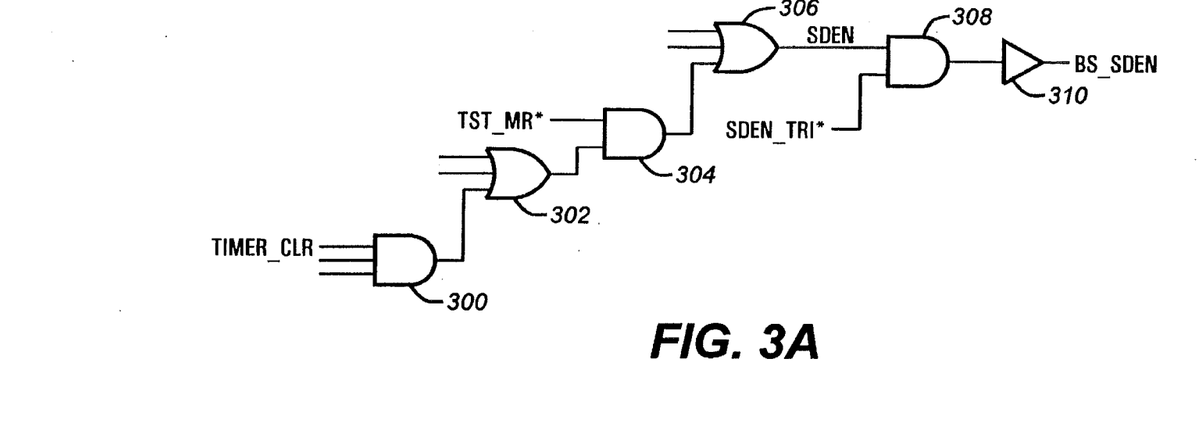
Figure 3B:
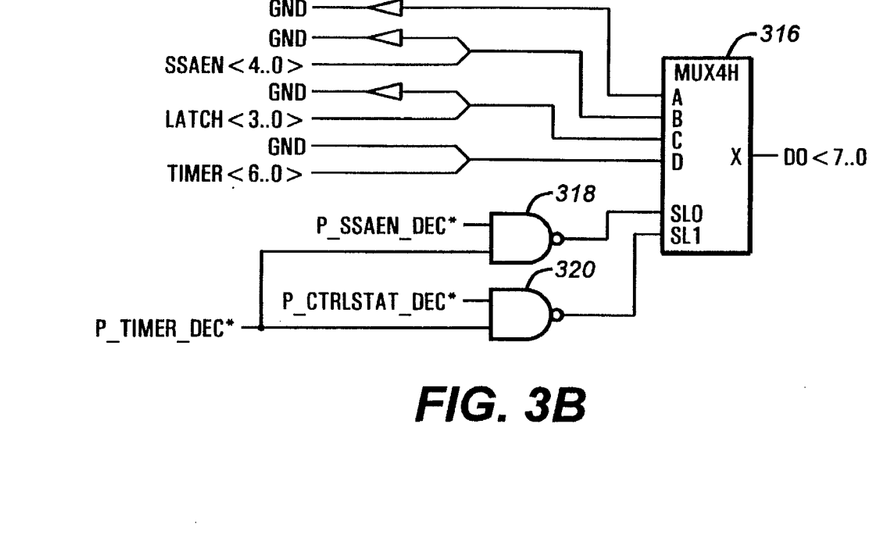
Figure 3C:
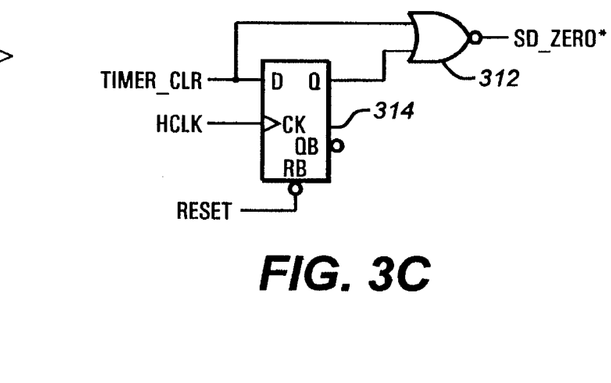

FIGS. 3A–3C show how TIMER_CLR forms part of the logic providing a data bus enable signal BS_SDEN. TIMER_CLR drives one input to a three-input AND gate 300. The other two inputs are not important and are high during normal operation of the rise time circuitry. When TIMER_CLR is high and the other two inputs to the AND gate 300 are high, the AND gate 300 drives a high signal to an OR gate 302, which in turn drives an input to an AND gate 304 high. The other input to this AND gate 304 is a test signal that is high during normal operation of the rise time circuitry. Assuming the test signal is also high, the AND gate 304 drives a high signal to an OR gate 306, which in turn provides a high signal to an AND gate 308. The AND gate's 308 other input is a tristate test signal SDEN_TRI*, which indicates whether to tristate the input/output buffers to the data lines 116. When SD_ZERO* is asserted low, circuitry in the data output logic of the system bus controller 112 forces the inputs to data output buffers to the data lines 116 low. This data output logic is not shown, but is readily apparent to one of ordinary skill in the art.

SDEN_TRI* is low if outputs to the data lines 116 are to be tristated, but if that signal is high, or unasserted, the output of the AND gate 308 is high. This forces a boundary scan data bus enable signal BS_SDEN high as the output of a driver 310. BS_SDEN enables the output drivers of bidirectional buffers in standard boundary scan cells to the data lines 116. When SDEN_TRI* is low, not only are the input/output buffers tristated, but they are also placed in input mode, as BS_SDEN is forced low.

In conjunction with enabling output drivers to the data bus, TIMER_CLR is also used to form a signal that causes the data lines 116 to be driven to zero. This signal, a data bus zero output signal SD_ZERO*, is provided as the output of a NOR gate 312. SD_ZERO* goes low when the data lines 116 are to be driven at zero, which occurs in the second half of START* during a rise time test. SD_ZERO* goes low, or true, when TIMER_CLR goes high. Further, a flip-flop 314 holds SD_ZERO* low until the next rising HCLK after TIMER_CLR also goes low. RESET is provided to the reset input of the flip-flop 314, HCLK clocks the flip-flop 314, and TIMER_CLR provides the D input to the flip-flop 314. The Q output of the flip-flop 314 drives an input to the NOR gate 312.

The microprocessor 106 reads TIMER[6 . . 0] by performing an I/O read from an I/O address P_TIMER. This forces two NAND gates 318 and 320 high, selecting the D output of the multiplexer 316. TIMER[6 . . 0] provides the lower seven bits to the D inputs of the eight line multiplexer 316, and the eighth bit is pulled low, to ground. The multiplexer 316 selects TIMER[6 . . 0] whenever P_TIMER_DEC* is asserted, reflecting a decode of an I/O operation at the address P_TIMER. P_TIMER_DEC* is provided as an input to NAND gates 318 and 320, which correspondingly drive the SL0 and SL1 select lines of the multiplexer 316. On such an I/O read, TIMER[6 . . 0] are then provided as the X output of the multiplexer 316, which in turn is provided to output buffers to the data lines 116 (not shown), which are enabled or disabled by BS_SDEN. An I/O read of P_TIMER thus returns the rise time of the last I/O read. Note that in FIG. 2, the AND gate 222 and the NAND gate 208 have as inputs P_TIMER_DEC*, which prevents the timer 201 from running when the I/O address P_TIMER is accessed, and correspondingly prevents TIMER[6 . . 0] from being cleared before they are read by the microprocessor 106.

Figure 4:
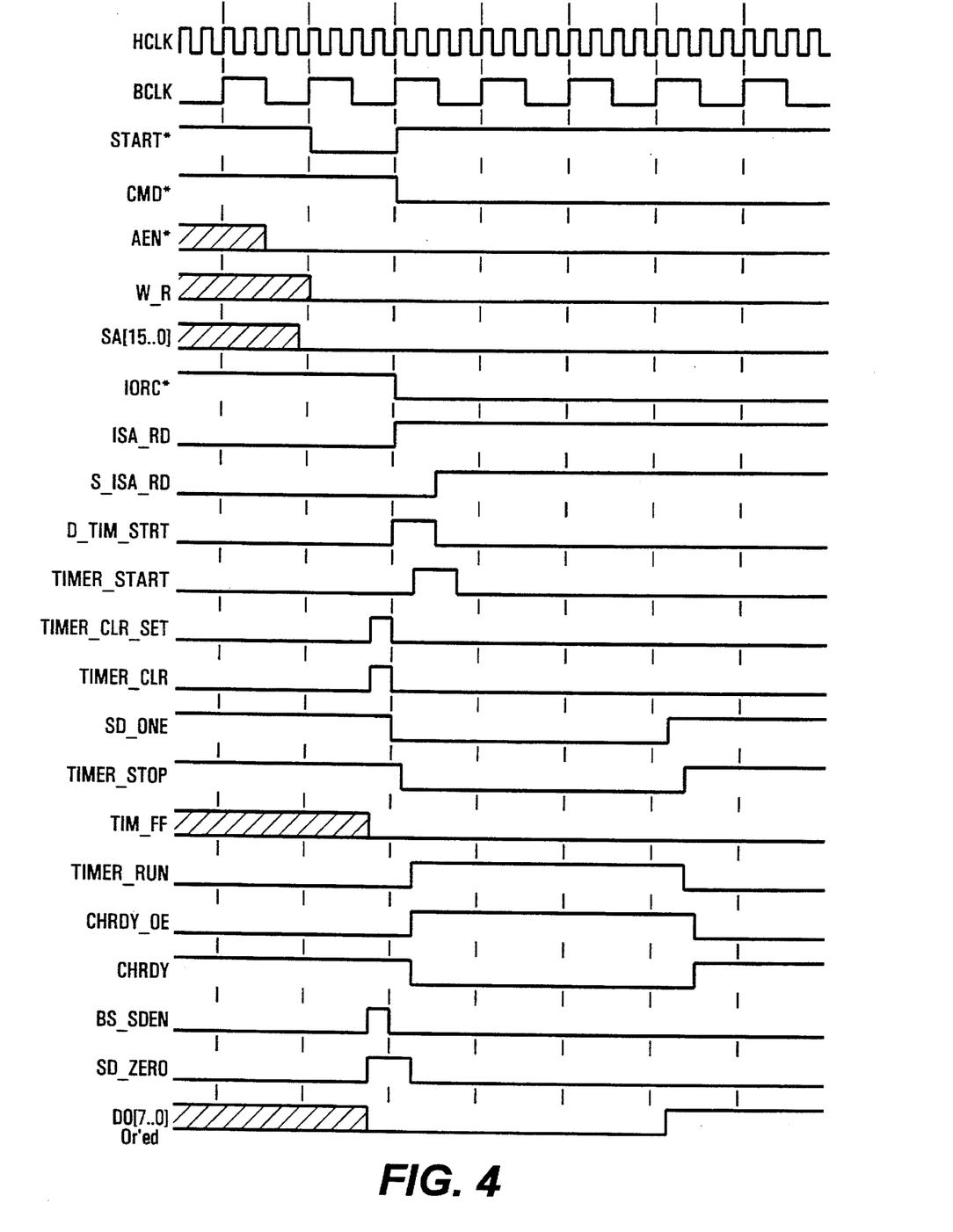
FIG. 4 is a timing diagram showing typical timing signals of the circuitry of FIGS. 2A–2I and 3A–3C.

RFTMEN is high when the rise time counter circuitry is enabled. This signal reflects a bit of a register in the system bus controller 112 set by writing to the I/O address P_CTRLSTAT. When the rise time circuitry is thus enabled, the various signals generally follow the timing diagram shown in FIG. 4. Specifically, the system bus controller 112 first asserts START* and then asserts CMD* and IORC*. During the second one-half BCLK of the assertion of START*, TIMER_CLR_SET* is asserted, causing the data lines 116 SD[7 . . 0] to be driven to zero through SD_ZERO. Once the system bus controller 112 asserts CMD* and IORC* low, or true, TIMER_START is asserted and TIMER_CLR is deasserted. TIMER_CLR was first asserted when TIMER_CLR_SET was asserted. Thus, the circuitry quits driving the data bus to zero and enables CHRDY_OE, which forces CHRDY signal low. This prevents the system bus controller 112 from completing the I/O or memory cycle until this particular rise time measurement run has been completed. TIMER_RUN is then asserted, causing the timer 201 to run. When either a timeout is indicated by TIM_FF going high or one of the data lines rises to the one threshold, as indicated by SD_ONE, TIMER_RUN is deasserted, and at the start of the next BCLK, CHRDY is deasserted, allowing the system bus controller 112 to continue the I/O cycle normally. The microprocessor 106 can then read the I/O address P_TIMER to retrieve the number of HCLKs that have passed between the driving of the data lines 116 to zero and one of those values then rising to one.

The greater the number of HCLKs, the less drive being provided by a particular board. An undriven bus will have a characteristic rise time within a few HCLKs. This undriven bus rise time is determined, for example, by disabling all of the slots 122 using an AEN mask register as described in Ser. No. 08/145,400, and then performing an I/O or memory read in the memory space or ISA board I/O address space with the rise time circuitry enabled. Because no board will respond, this corresponds to a read of an undriven bus. The value of the timer 201 is then retrieved by reading the I/O address P_TIMER, and the microprocessor 106 stores this value as representing the rise time of an undriven data bus. The microprocessor 106 then performs a rise time measurement read with all but one of the slots 122 disabled and compares the resulting rise time with the stored undriven data bus rise time. A response time shorter than the undriven response time indicates a particular board under test is driving the data lines 116. To account for slight variations in response time, a padding value should be incorporated in this comparison. For example, a response time should be at least two timer counts less than the undriven response time to be considered driven. In this way, even when a board drives the data lines 116 to their normally undriven value of 0FFh, the system 100 determines that the board is in fact driving the data lines 116 because the data lines 116 reach 0FFh more quickly. The microprocessor 106 then repeats the rise time measurements for all of the addresses that a slot 122 under test has returned as undriven. The microprocessor flags each location returning a shorter rise time as indicating expansion board in the slot 122 under test is actually responding to an I/O read.

It will be readily appreciated that the invention can also be practiced by pulling the data lines 116 down to a logical value of zero, rather than pulling them up to a logical value of 0FFh. This merely entails tying the pull-up resistors 117 of FIG. 1 to ground instead of VCC. Then, instead of precharging the data bus to zero, the data bus is precharged to 0FFh, and the fall time of the data lines 116 is measured by determining when any data line goes to zero rather than to one.

It will further be recognized that not all of the data lines 116 need be driven and tested. Instead of pulling up and testing the data lines 116 SD[7 . . 0], a lesser number can be tested. For example, simply by testing the data line 116 SD[0], one can effectively practice the invention.

Figure 5A:
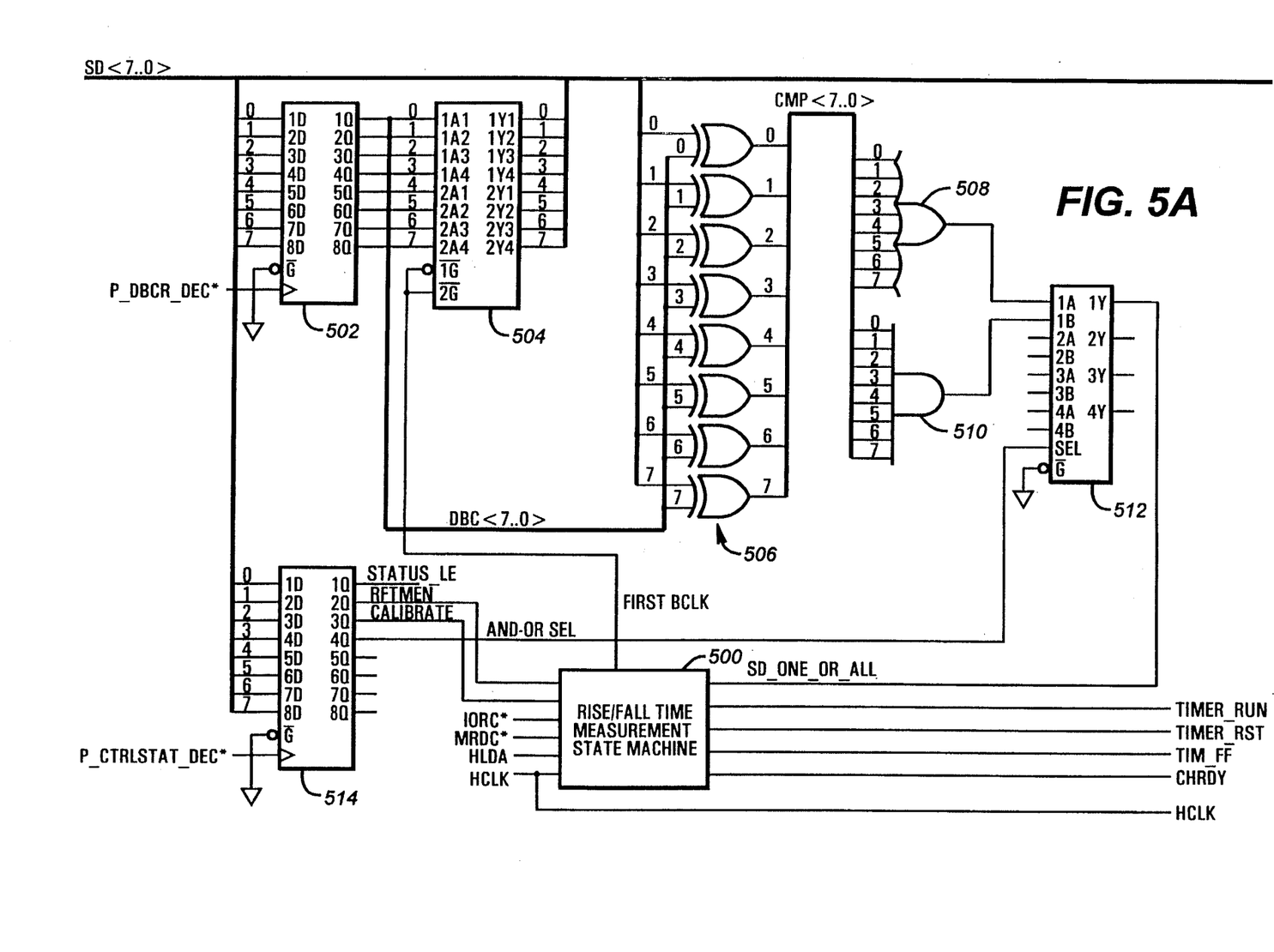
FIGS. 5A and 5B are an alternative embodiment according to the invention in which the data bus can be predriven to an arbitrary value, and the response time can either be based on either one bit changing from that predetermined value or all the bits changing from that predetermined value.
Figure 5B:
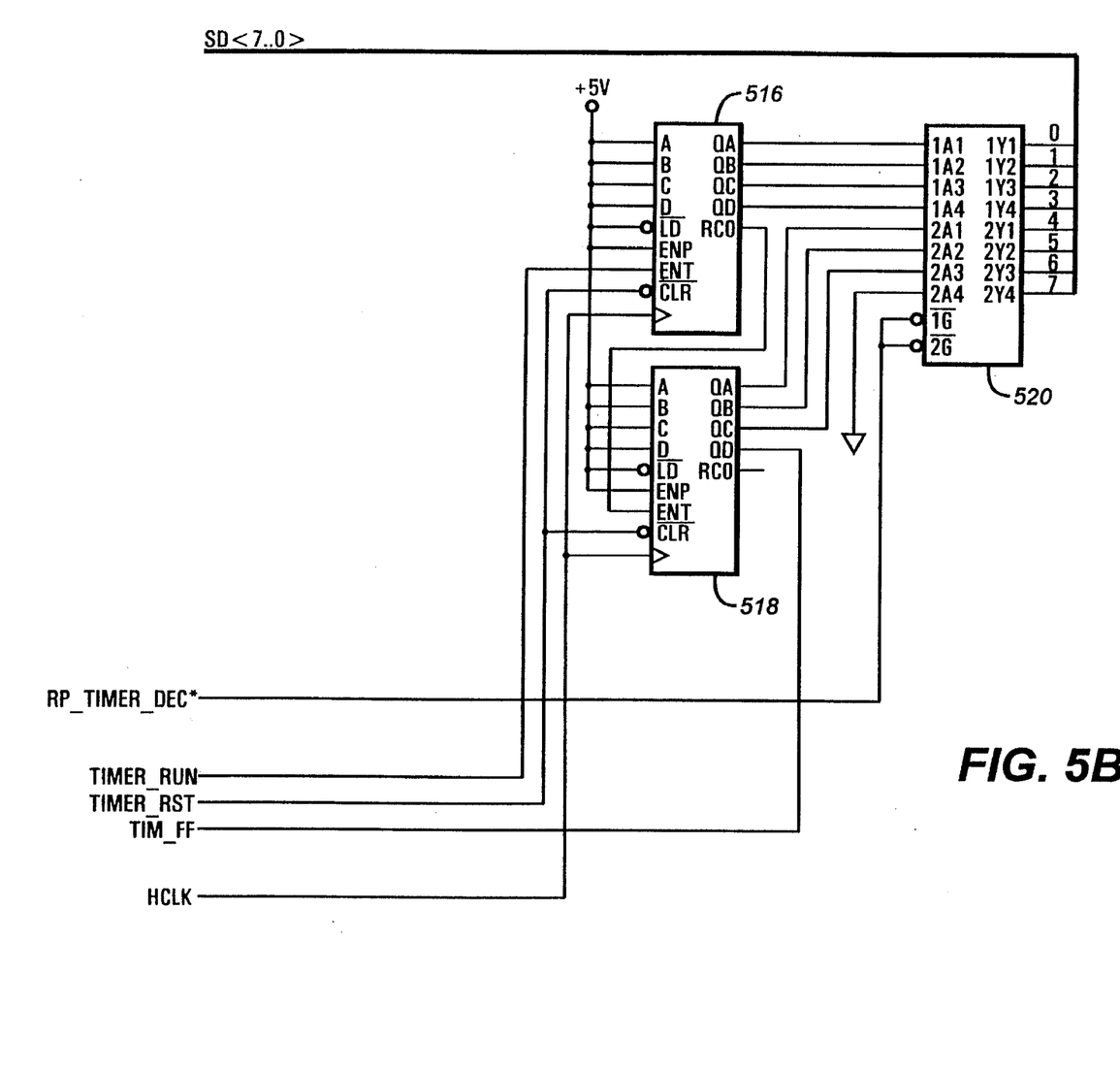

FIGS. 5A and 5B are a schematic/block diagram of an alternative embodiment. A rise/fall time measurement state machine 500 embodies most of the circuitry shown in FIGS. 2A–2I and 3A–3C. Instead of SD_ONE being by an OR gate 234, however, the circuit of FIGS. 5A–5B provide multiple options. A register 502, which is loaded by an I/O write to P_DBCR by enabling the buffer through a signal P_DBCR_DEC*, can be loaded with a value other than 00h. Instead of driving the data lines 116 to 00h when TIMER_CLR goes true, an output buffer 504 drives the data lines 116 SD[7 . . 0] to the values stored in the register 502. TIMER_CLR is disabled and a series of XOR gates 506 with inputs from both the data lines 116 and the register 502 compare the value on the data lines 116 SD[7 . . 0] with the value in the register 502. As long as these values are the same, all of the outputs of the XOR gates 506 are zero.

The XOR gates 506 provide inputs to both an OR gate 508 and an AND gate 510, instead of just to an OR gate. This provides for two types of data bus response time measurements. A multiplexer 512 with inputs from both the OR gate 508 and the AND gate 510 selects between those inputs and provides a signal SD_ONE_OR_ALL to the rise/fall time measurement state machine 500. The select line of the multiplexer 512 is provided by an AND/OR select signal by the P_CTRLSTATE register 514, which is loaded by an I/O write to P_CTRLSTATE. SD_ONE_OR corresponds to SD_ONE of FIGS. 2A–2I, but has enhanced functionality. If the multiplexer 512 selects the OR gate 508, SD_ONE_OR_ALL behaves as does SD_ONE. If the AND gate 510 is selected, however, SD_ONE_OR_ALL remains low until all of the values on the data lines 116 have changed from their initial values as driven onto the data lines 116 by the buffer 504 and as provided by the register 502.

Using the AND gates 510 to provide SD_ONE_OR_ALL allows one to measure the maximum rise time of the various data lines 116 rather than the minimum rise time, as is provided by using the OR gate 508. This feature could be used to "performance tune" the bus, allowing the system to shorten the read cycle time to match the capability of the expansion board. By determining the maximum response time of the expansion board, the system can then shorten the cycle time for that board by an appropriate number of BCLKs, thus improving system performance.

One example of how this can be done is by varying the number of wait states incorporated in the operation. As well known to those skilled in the art, ISA cycles contain a default number of BCLK signal wait states, one for 16 bit operations and four for 8 bit operations, resulting in three BCLK and six BCLK signal cycle basic operation times. This is shown in state machine form in FIG. 10 of U.S. Pat. No. 5,165,037, which patent is hereby incorporated by reference. However, both of these times can be shortened by use of the NOWS signal, as shown in FIG. 10. A separate circuit can be used which detects an operation directed to an address value in a preselected range and loads a counter with an appropriate cycle length value. The counter counts on the BCLK signal. When the counter completes operation, the NOWS signal is driven appropriately to terminate or shorten the cycle. By having a plurality of programmable address ranges and associated counter values, a large number of variations can be handled. Alternatively, instead of a separate circuit, the logic can be incorporated in the bus controller of the computer system. In that case the state machine of FIG. 10, or its equivalent, is modified to return on the NOWS* signal or on the counter output-based signal. Thus with the actual rise time of each expansion board determined as described above, the programmable logic is appropriately set and each expansion board runs at its optimal rate.

The counters 516 and 518 operate as do counters 246 and 248 in the circuit shown in FIG. 2. The multiplexer 316 of FIG. 3 is replaced by a register 520, whose inputs are provided by the outputs of the counters 516 and 518, and which is enabled by an I/O read to P_TIMER. Finally, the eighth output bit of the counters timers 246 and 248 is used as the timeout signal TIM_FF.

Figure 6:
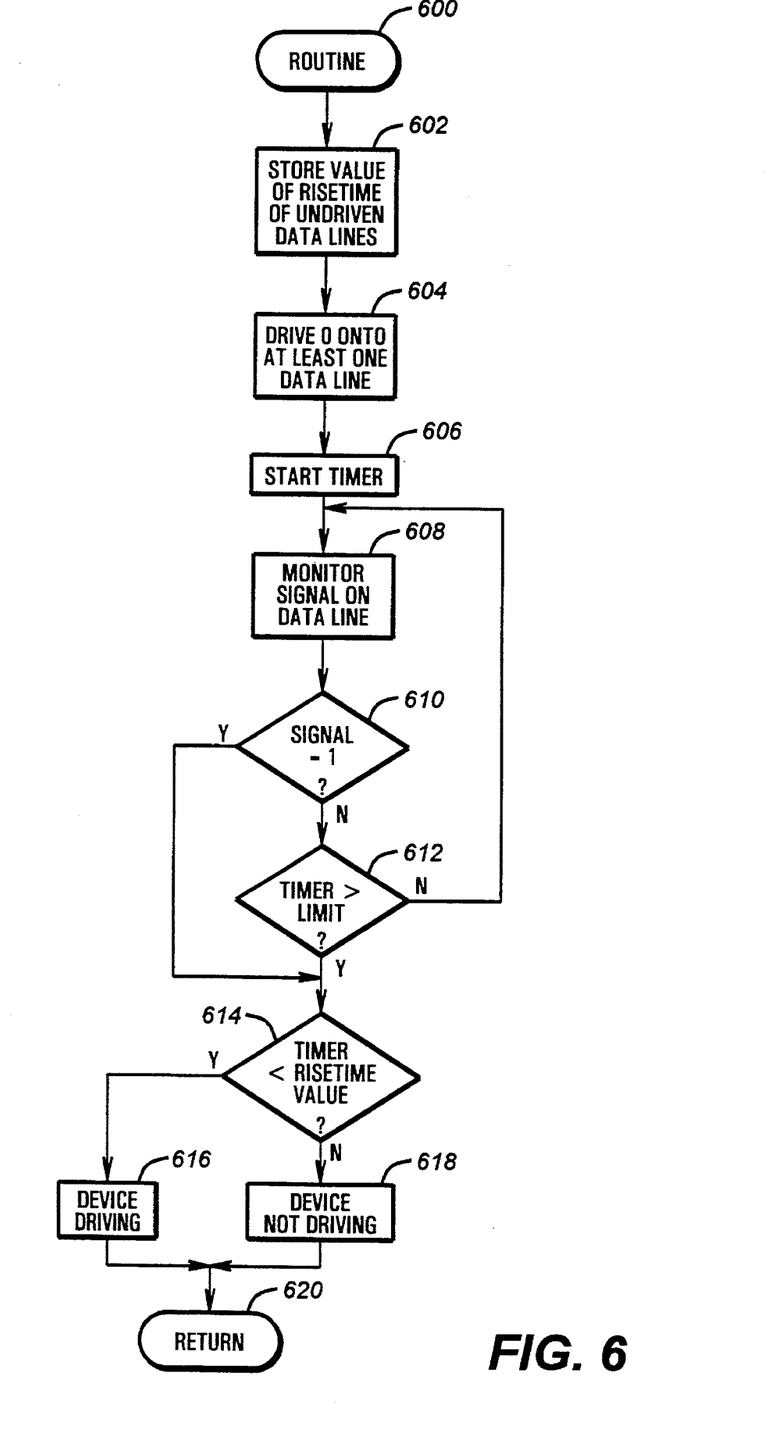
FIG. 6 is a flowchart illustration of the method for determining device presence according to the invention.

Turning to FIG. 6, shown is a routine for determining whether a device is driving a normally undriven value onto the data lines 116 according to the invention. The routine 600 begins at step 602, where it stores a value of the rise time of undriven data lines 116. This is the amount of time it takes for the data lines 116 to rise from a value of zero to a value of one when the data lines are not being actively driven by a device. Proceeding to step 604, a zero is driven onto at least one of the data lines 116. Proceeding to step 606, a timer, such as the timer 201, is started which will measure the rise time of the data lines 116. Proceeding to step 608, the signal on the data line 116 is monitored. At step 610, if that signal is not equal to one, this indicates the data line 116 has not yet risen, so control proceeds to step 612 where it is determined whether the timer has exceeded some predetermined limit, such as the rise time of the data lines 116 when undriven. If the timer has not exceeded the limit, control loops to step 608 where the signal continues to be monitored. If the signal has risen to a value of one at step 610, or the timer has exceeded the limit at step 612, control proceeds to step 614, where it is determined whether the timer value is less than the value stored at step 602 for the rise time of the data lines 116 when undriven. If so, control proceeds to step 616, where it is determined that a device is driving the data lines 116; otherwise, control proceeds to step 618, where it is determined that a device is not driving the data lines 116. From step 616 and 618, control returns at step 620.

As can be appreciated, a number of modifications to the circuitry and the method of the invention will still embody the basic concept of using the response time of the data lines 116 to determine whether a device is actually responding to an I/O or memory read. Although the disclosed embodiment focused on reads from I/O addresses, the same procedure could be used for reading from memory addresses. The system bus 104 can also be an ISA bus, with appropriate modifications to the circuitry of FIGS. 2A–2I. All of these various ways of implementing the invention will be understandable by one knowledgeable in computer bus designs.

The foregoing disclosure and description of the invention are illustrative and explanatory, and various changes in the size, shape, materials, components, circuit elements, wiring connections and contacts, as well as in the details of the illustrated circuitry and construction and method of operation may be made without departing from the spirit of the invention.

I claim:

1. A method of determining if a device is driving data lines on a bus in response to a read operation in a system with a processor for initiating read operations and with the bus having the data lines, address lines, and control lines, all of which carry signals, the method comprising the steps of:

(1) driving a first predetermined value onto at least one of the data lines for a first period of a read operation;

(2) monitoring the signal on said at least one of the data lines after completion of step (1); and (3) timing a period from said driving step (1) until the signal on said at least one of the data lines changes to a second predetermined value, and wherein said first predetermined value is zero and said second predetermined value is a value corresponding to all of the monitored signals of step (2) equalling one.

2. A method of determining if a device is driving data lines on a bus in response to a read operation in a system with a processor for initiating read operations and with the bus having the data lines, address lines, and control lines, all of which carry signals, the method comprising the steps of:

(1) driving a first predetermined value onto at least one of the data lines for a first period of a read operation;

(2) monitoring the signal on said at least one of the data lines after completion of step (1);

(3) timing a period from said driving step (1) until the signal on said at least one of the data lines changes to a second predetermined value;

before step (1), storing a value indicative of the period until said at least one of the data lines changes to said second predetermined value when the data lines are undriven; and after step (3), comparing the period timed by step (3) with said stored value for when the data lines are undriven and if the time of step (3) is shorter than the stored value for when the data lines are undriven, indicating that a device has driven at least one of the data lines in response to the read operation.

3. The method of claim 2, wherein said first predetermined value is zero and said second predetermined value is any value other than said first predetermined value.

4. The method of claim 2, wherein said first predetermined value is all ones and said second predetermined value is any value other than said first predetermined value.

5. A method of determining if an expansion board is driving data lines on a bus in response to a read operation in a system with a processor for initiating read operations and with the bus having the data lines, address lines, and control lines, the method comprising the steps of:

(1) driving a first value onto the data lines for a predetermined period;

(2) starting a timer that provides a timer value after completion of step (1);

(3) monitoring the data lines after completion of step (1) until a monitored value is different from said first value driven onto the data lines or until a predetermined time is reached, whichever occurs first, and capturing the timer value at such moment; and (4) comparing the timer value with an undriven bus timer value, and if shorter by a predetermined amount, flagging an address present on the address lines as being driven by the expansion board, else flagging the address present on the address lines as not being driven by the expansion board.

6. A computer system for detecting presence of devices at certain addresses, comprising:

a system bus including address, data, and control lines;

a microprocessor for executing a read operation, said microprocessor coupled to said system bus;

a means for measuring a response time of the data lines on said system bus to the read operation, including means for driving a portion of the data lines to a first predetermined value during a first portion of the read operation;

means for monitoring the portion of the data lines during a second portion of the read operation, said means for monitoring detecting when the value on the data lines has changed from the first predetermined value; and a timer coupled to said system bus and said means for monitoring, said timer starting at or after a start of the read operation and said timer stopping responsive to said means for monitoring detecting when the value on the portion of the data lines has changed from the first predetermined value.

7. The system of claim 6, wherein said system bus is an industry standard architecture bus.

8. The system of claim 6, wherein said system bus is an EISA bus.

9. A method of improving computer system performance by determining a maximum response time of a device in response to a read operation in a system with a processor for initiating the read operation with a cycle time and with a bus with data lines, address lines, and control lines, all of which carry signals, the method comprising the steps of:

(1) driving a first predetermined value onto a plurality of the data lines for a first period of a read operation;

(2) monitoring a plurality of signals on the data lines after completion of step (1);

(3) timing a period from said driving step (1) until the plurality of the signals on the data lines changes to a second predetermined value; and (4) reducing the cycle time of the read operation to a value corresponding to the period determined at step (3).

10. The method of claim 9, wherein said first predetermined value is zero and said second predetermined value is all ones.

11. An apparatus for improving computer system performance by determining a maximum response time of a device responding to a read operation in a computer system with a system bus with address, data, and control lines and with a microprocessor for initiating the read operation with a cycle time, the apparatus comprising:

means for driving a plurality of the data lines to a first predetermined value during a first portion of the read operation;

means for monitoring the plurality of the data lines during a second portion of the read operation, said means for monitoring detecting when the value on all of the plurality of the data lines has changed from the first predetermined value;

a timer coupled to the system bus and said means for monitoring, said timer starting at or after a start of the read operation and said timer stopping responsive to said means for monitoring detecting when the value on all of the plurality of the data lines has changed from the first predetermined value; and means for reducing the cycle time of the read operation to a value corresponding to a period recorded by said timer.

12. The apparatus of claim 11, wherein said first predetermined value is zero.

13. A computer system for improving system performance, comprising:

a system bus including address, data, and control lines;

a microprocessor for executing a read operation, said microprocessor coupled to said system bus;

a means for measuring a response time of the data lines on said system bus to the read operation, including means for driving a plurality of the data lines to a first predetermined value during a first portion of the read operation;

means for monitoring the plurality of the data lines during a second portion of the read operation, said means for monitoring detecting when the value on all of the plurality of the data lines has changed from the first predetermined value;

a timer coupled to said system bus and said means for monitoring, said timer starting at or after a start of the read operation and said timer stopping responsive to said means for monitoring detecting when the value on all of the plurality of the data lines has changed from the first predetermined value; and means for reducing a read operation cycle time to a value corresponding to a period recorded by said timer.

14. The system of claim 13, wherein said system bus is an industry standard architecture bus.

15. The system of claim 13, wherein said system bus is an extended industry standard architecture bus.

* * * * *